US010773270B2

(12) United States Patent
Zeng et al.

(10) Patent No.: US 10,773,270 B2
(45) Date of Patent: Sep. 15, 2020

(54) FLUID CLEANING APPRATUS

(71) Applicant: National Chung-Shan Institute of Science and Technology, Taoyuan (TW)

(72) Inventors: Yi-Rong Zeng, Taoyuan (TW); Kuan-You Liu, Taoyuan (TW); Yu-Ping Wang, Taoyuan (TW); Chin-Cheng Wu, Taoyuan (CN); Min-Han Chiu, Taoyuan (TW); Yew-Shyang Lay, Taoyuan (TW)

(73) Assignee: National Chung-Shan Institute of Science and Technology, Taoyuan (TW)

(*) Notice: Subject to any disclaimer, the term of this patent is extended or adjusted under 35 U.S.C. 154(b) by 202 days.

(21) Appl. No.: 16/116,891

(22) Filed: Aug. 29, 2018

(65) Prior Publication Data
US 2019/0366371 A1 Dec. 5, 2019

(30) Foreign Application Priority Data

May 30, 2018 (TW) .............................. 107118439 A (51) Int. Cl.
*B05B 12/00* (2018.01)
*B60K 17/354* (2006.01)
(Continued)

(52) U.S. Cl.
CPC ............ *B05B 12/004* (2013.01); *B05B 12/18* (2018.02); *B08B 3/024* (2013.01); *B60K 17/28* (2013.01);
(Continued)

(58) Field of Classification Search
CPC ... A47L 2201/00; B05B 15/60; B05B 12/004; B60L 2200/40; B08B 3/024
See application file for complete search history.

(56) References Cited

U.S. PATENT DOCUMENTS 7,761,954 B2 * 7/2010 Ziegler ..................... A47L 5/14
15/320
2012/0110755 A1 * 5/2012 Liu ..................... A47L 11/4047
15/1.51
(Continued)

FOREIGN PATENT DOCUMENTS

CN 207032947 U * 2/2018

*Primary Examiner* — Joseph L. Perrin
*Assistant Examiner* — Irina Graf
(74) *Attorney, Agent, or Firm* — Winston Hsu (57) ABSTRACT

A fluid cleaning apparatus includes a driving assembly including a motor, a gear clutching assembly, a moving assembly, a swaying spray assembly, a sensing assembly, and a controlling module. The fluid cleaning apparatus integrates functions of movement actuation and spraying angle adjustment with the motor and achieves versatile spraying angles for spray-cleaning with apparatus configuration convertible between swaying motion and ceased swaying motion and/or between moving motion and ceased moving motion. Besides, self-propelled movement, spraying pressure modulation, and spraying angle adjustment can be controlled by the control module or manually remotely controlled by a user. Since the fluid cleaning apparatus of the present application saves the conventional installation cost and space needed, as well as resources consumed, for cleaning the bottom of an object to be cleaned, the fluid cleaning apparatus can be extensively applied to multiple fields.

13 Claims, 11 Drawing Sheets

(51) Int. Cl.
*B60K 17/28* (2006.01)
*G05D 1/00* (2006.01)
*B08B 3/02* (2006.01)
*G06K 9/00* (2006.01)
*B05B 12/18* (2018.01)

(52) U.S. Cl.
CPC ......... *B60K 17/354* (2013.01); *G05D 1/0022* (2013.01); *G05D 1/0094* (2013.01); *G06K 9/00664* (2013.01); *G05D 2201/0203* (2013.01)

(56) References Cited

U.S. PATENT DOCUMENTS

2014/0182627 A1* 7/2014 Williams ............ A47L 11/4044
134/21
2017/0209015 A1* 7/2017 Liu ....................... A47L 9/0433

* cited by examiner

FLUID CLEANING APPRATUS

BACKGROUND OF THE INVENTION

1. Field of the Invention

The invention relates to a fluid cleaning apparatus, and more particularly, to an intelligent programmable self-propelled spraying fluid cleaning apparatus.

2. Description of the Prior Art

Conventional method for cleaning the bottom of an aircraft, a carrier, a machine or any other object to be cleaned is to move the object to a designated site where multiple nozzles are configured and oriented upward. Conventionally the designated site is permanent and therefore has no mobility. Besides, a large number of cleaning apparatuses are conventionally needed to be extensively configured on the designated site for meeting the various requirements of cleaning carriers or machines of diversified sizes. Therefore, the conventional method not only takes a larger area of site but also results in higher cost of installation and of consumed resources during the cleaning process.

On the other hand, conventional self-propelled spraying apparatuses are often used for agricultural irrigation, agricultural fertilization, pesticide spraying, or plant epidemic prevention. The conventional spraying method is to spray fluid in a fixed direction and unable to detect the position and distance of the object so as to perform a spraying task with versatile spraying angles. Therefore, conventional self-propelled spraying apparatus can only spray the fluid covering a smaller area, which not only takes longer to finish the whole spraying task but also is unable to cover existent blind sides.

Besides, a conventional self-propelled apparatus is composed of a moving mechanism and other movable mechanisms which are respectively driven by isolated actuating mechanisms. Therefore, configuration of the conventional self-propelled apparatus requires a large number of actuating parts for moving the various mechanisms, which has the problems of heavier weights, higher cost of production, higher consumption of electricity or fuel during operation, and more complex procedure of maintenance.

Therefore, it is important to develop a fluid cleaning apparatus with mobility, versatile spraying angles, low cost, and utilization convenience to achieve purposes of reducing the installation cost, reducing the resources consumed during cleaning, and saving the space needed for cleaning the bottom of the object to be cleaned.

SUMMARY OF THE INVENTION

Therefore, it is an objective of the present application to provide a fluid cleaning apparatus with mobility, versatile spraying angles, low cost, and utilization convenience to achieve purposes of reducing the installation cost, reducing the resources consumed during cleaning, and saving the space needed for cleaning the bottom of an object to be cleaned.

To achieve the aforementioned objective, an embodiment of the present application discloses a fluid cleaning apparatus which includes a driving assembly, a gear clutching assembly, a moving assembly, a swaying spray assembly, and a controlling module. The driving assembly includes a motor and at least one driving gear. The at least one driving gear is disposed on a shaft of the motor. The gear clutching assembly includes a first clutching gear, a second clutching gear, a first retractable shaft, a second retractable shaft, a first actuating unit, and a second actuating unit. The first clutching gear is disposed adjacent to the at least one driving gear. The second clutching gear is disposed adjacent to the at least one driving gear. The first retractable shaft is connected with the first clutching gear. The second retractable shaft is connected with the second clutching gear. The first actuating unit is disposed on the first retractable shaft. The second actuating unit is disposed on the second retractable shaft. The moving assembly includes a driven moving gear, a driven moving gear shaft, and a plurality of driven wheels. The driven moving gear is disposed adjacent to the first clutching gear. The driven moving gear shaft is connected with the driven moving gear. The plurality of driven wheels disposed on the driven moving gear shaft. The swaying spray assembly includes a driven spray gear, a rotating shaft, a plurality of crank linkage devices, a plurality of manifolds, and a plurality of nozzles. The driven spray gear is disposed adjacent to the second clutching gear. The rotating shaft connected with the driven spray gear. The plurality of crank linkage devices is disposed on two ends of the rotating shaft. The plurality of manifolds connected with the plurality of crank linkage devices respectively. The plurality of nozzles disposed on the plurality of manifolds. The controlling module includes a wireless signal transmitting device and a logical processing unit. The wireless signal transmitting device receives a signal from a remote wireless emitter. The logical processing unit is electrically connected with the wireless signal transmitting device, the motor, the first actuating unit, and the second actuating unit and for controlling operation of the motor, the first actuating unit, and the second actuating unit according to the signal received by the wireless signal transmitting device. The logical processing unit controls the first actuating unit to move the first retractable shaft, such that the first clutching gear engages or disengages the at least one driving gear and the driven moving gear. The logical processing unit further controls the second actuating unit to move the second retractable shaft, such that the second clutching gear engages or disengages the at least one driving gear and the driven spray gear.

According to an embodiment of the present application, a plurality of fluid transporting holes are respectively formed on the plurality of manifolds so as to transport a cleaning fluid into the plurality of manifolds.

According to an embodiment of the present application, the motor of the driving assembly is a motor with variable rotational speed controlled by the logical processing unit.

According to an embodiment of the present application, when the first clutching gear engages with the at least one driving gear and the driven moving gear, the motor and the at least one driving gear drive rotation of the driven moving gear via the first clutching gear so as to drive the plurality of driven wheels.

According to an embodiment of the present application, the plurality of driven wheels comprises two driven wheels, the moving assembly further comprises a second driven moving gear and a second driven moving gear shaft, and each of the two driven wheels respectively corresponds to a first set of the driven moving gear shaft and the driven moving gear, and to a second set of the second driven moving gear shaft and the second driven moving gear for respectively driving each of the two driven wheels for steering.

According to an embodiment of the present application, when the second clutching gear engages with the at least one driving gear and the driven spray gear, the motor and the at least one driving gear drive rotation of the driven spray gear via the second clutching gear so as to drive the rotating shaft, the plurality of crank linkage devices and the plurality of manifolds for spray-cleaning with versatile spraying angles.

According to an embodiment of the present application, the fluid cleaning apparatus further comprises a sensing assembly comprising a plurality of distance sensing units electrically connected with the logical processing unit for transmitting real-time measured distance data to the logical processing unit, and the plurality of distance sensing unit is at least one of an ultrasonic distance sensing unit, an infrared distance sensing unit, and a laser distance sensing unit.

According to an embodiment of the present application, the sensing assembly further comprises at least one camera electrically connected with the logical processing unit, and the logical processing unit performs image recognition algorithm on a feedback real-time image transmitted from the at least one camera so as to determine a dirty area on a cleaned object and to adjust a spraying pressure, a spraying angle or motion of the swaying spray assembly.

According to an embodiment of the present application, the plurality of distance sensing units comprise a horizontal distance sensing unit and a vertical distance sensing unit, the logical processing unit processes feedback measured distance data transmitted from the horizontal distance sensing unit so as to determine a proper moving direction for controlling operation of the motor and the first actuating unit, and the logical processing unit further processes feedback measured distance data transmitted from the vertical distance sensing unit so as to calculate a distance from a bottom of a cleaned object to be cleaned by the fluid cleaning apparatus for determining a spraying pressure of the swaying spray assembly.

According to an embodiment of the present application, the wireless signal transmitting device of the controlling module transmits status information of the driving assembly, the gear clutching assembly, and data processed by the logical processing unit to a remote wireless receiver.

According to an embodiment of the present application, the fluid cleaning apparatus further comprises a waterproof assembly comprising a box body, at least one partition plate and at least one waterproof strip for providing waterproof and dustproof functions.

In summary, the fluid cleaning apparatus disclosed by the present application integrates functions of movement actuation and spraying angle adjustment with a single motor and achieves versatile spraying angles used for spray-cleaning with convertible apparatus configurations between the swaying motion and the ceased swaying motion and/or between the moving motion and the ceased moving motion. Besides, self-propelled movement, spraying pressure modulation, and spraying angle adjustment against the recognized dirty area can be controlled by algorithm of the control module or manually remotely controlled by the user. Since the fluid cleaning apparatus of the present application saves the conventional installation cost and needed space, as well as consumed resources, for cleaning the bottom of an object to be cleaned, the fluid cleaning apparatus can be extensively applied to multiple fields.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
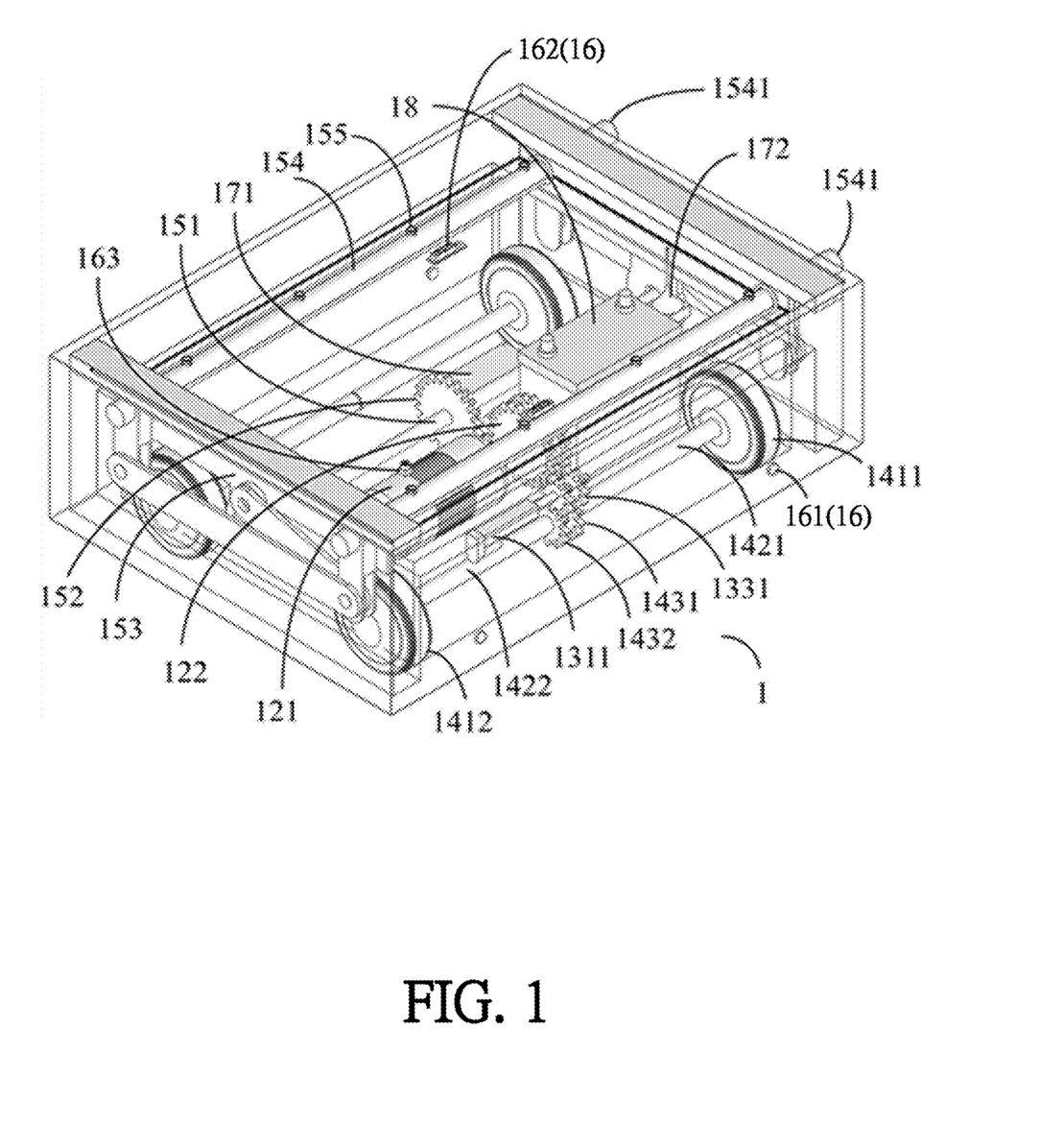
FIG. 1 is a perspective diagram of a fluid cleaning apparatus according to an embodiment of the present application.
Figure 2:
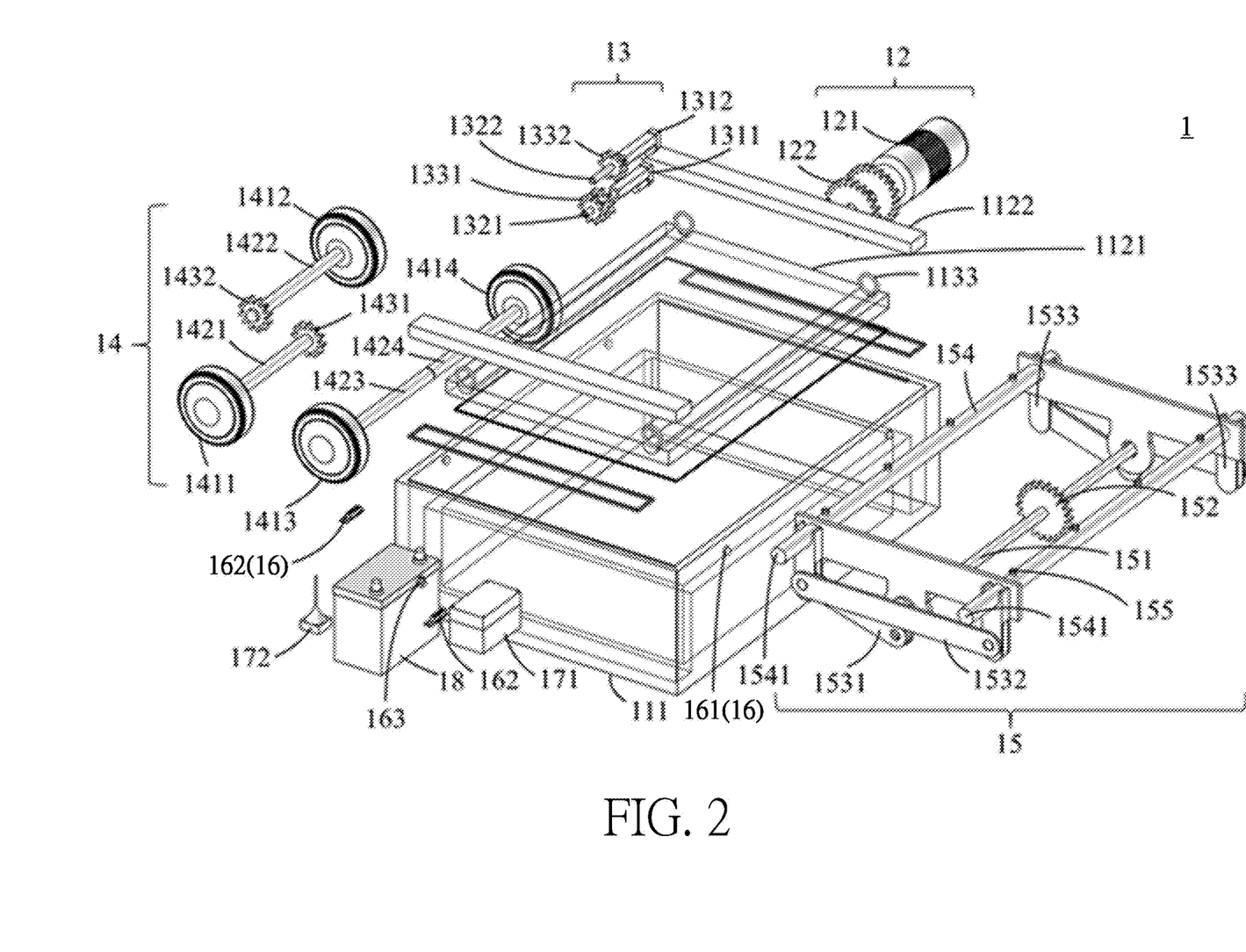
FIG. 2 is an exploded diagram of the fluid cleaning apparatus according to the embodiment of the present application.

Please refer to FIG. 1 and FIG. 2. FIG. 1 is a perspective diagram of a fluid cleaning apparatus 1 according to an embodiment of the present application. FIG. 2 is an exploded diagram of the fluid cleaning apparatus 1 according to the embodiment of the present application. The fluid cleaning apparatus 1 of the present application includes a driving assembly 12, a gear clutching assembly 13, a moving assembly 14, a swaying spray assembly 15, and a control module 17.

The driving assembly 12 includes a motor 121 and at least one driving gear 122 disposed on a shaft of the motor 121. The gear clutching assembly 13 includes a first clutching gear 1331, a second clutching gear 1332, a first retractable shaft 1321, a first actuating unit 1311, a second retractable shaft 1322, and a second actuating unit 1312. The first clutching gear 1331 is disposed adjacent to the driving gear 122. The second clutching gear 1332 is disposed adjacent to the driving gear 122. The first retractable shaft 1321 is connected with the first clutching gear 1331. The first actuating unit 1311 is disposed on the first retractable shaft 1321. The second retractable shaft 1322 is connected with the second clutching gear 1332. The second actuating unit 1312 is disposed on the second retractable shaft 1322.

The moving assembly 14 includes a plurality of driven wheels 1411, 1412, 1413, 1414 and driven moving gear shafts 1421, 1422, 1423, 1424, that is, a front-left driven wheel 1411, a front-right driven wheel 1412, a rear-left driven wheel 1413, a rear-right driven wheel 1414, a front-left driven moving gear shaft 1421, a front-right driven moving gear shaft 1422, a rear-left driven moving gear shaft 1423 and a rear-right driven moving gear shaft 1424. The plurality of driven wheels 1411, 1412, 1413, 1414 are respectively disposed on the driven moving gear shafts

1421, 1422, 1423, 1424. The moving assembly 14 further includes driven moving gears 1431, 1432, that is, a front-left driven moving gear 1431 and a front-right driven moving gear 1432. The front-left driven moving gear 1431 and the front-right driven moving gear 1432 are connected with the front-left driven moving gear shaft 1421 and the front-right driven moving gear shaft 1422 respectively, and both the front-left driven moving gear 1431 and the front-right driven moving gear 1432 are disposed adjacent to the first clutching gear 1331.

The swaying spray assembly 15 includes a driven spray gear 152, a rotating shaft 151, a plurality of crank linkage devices 153, a plurality of the manifolds 154, and a plurality of nozzles 155. The driven spray gear 152 is disposed adjacent to the second clutching gear 1332. The rotating shaft 151 is connected with the driven spray gear 152. The plurality of crank linkage devices 153 are disposed on two ends of the rotating shaft 151. The plurality of manifolds 154 are connected with the plurality of crank linkage devices 153. The plurality of nozzles 155 are disposed on the plurality of manifolds 154. In practical application, a plurality of fluid transportation holes 1541 are respectively formed on the plurality of manifolds 154 so as to transport a cleaning fluid into the plurality of manifolds 154.

The control module 17 includes a wireless signal transmitting device 172 and a logical processing unit 171. The wireless signal transmitting device 172 can receive a signal from a remote control device operated by a user. The logical processing unit 171 is electrically connected with the wireless signal transmitting device 172, the motor 121, the first actuating unit 1311 and the second actuating unit 1312. Therefore, the logical processing unit 171 can control operation of the motor 121, the first actuating unit 1311 and the second actuating unit 1312 according to the signal received by the wireless signal transmitting device 172 to achieve remote control function.

Figure 3:
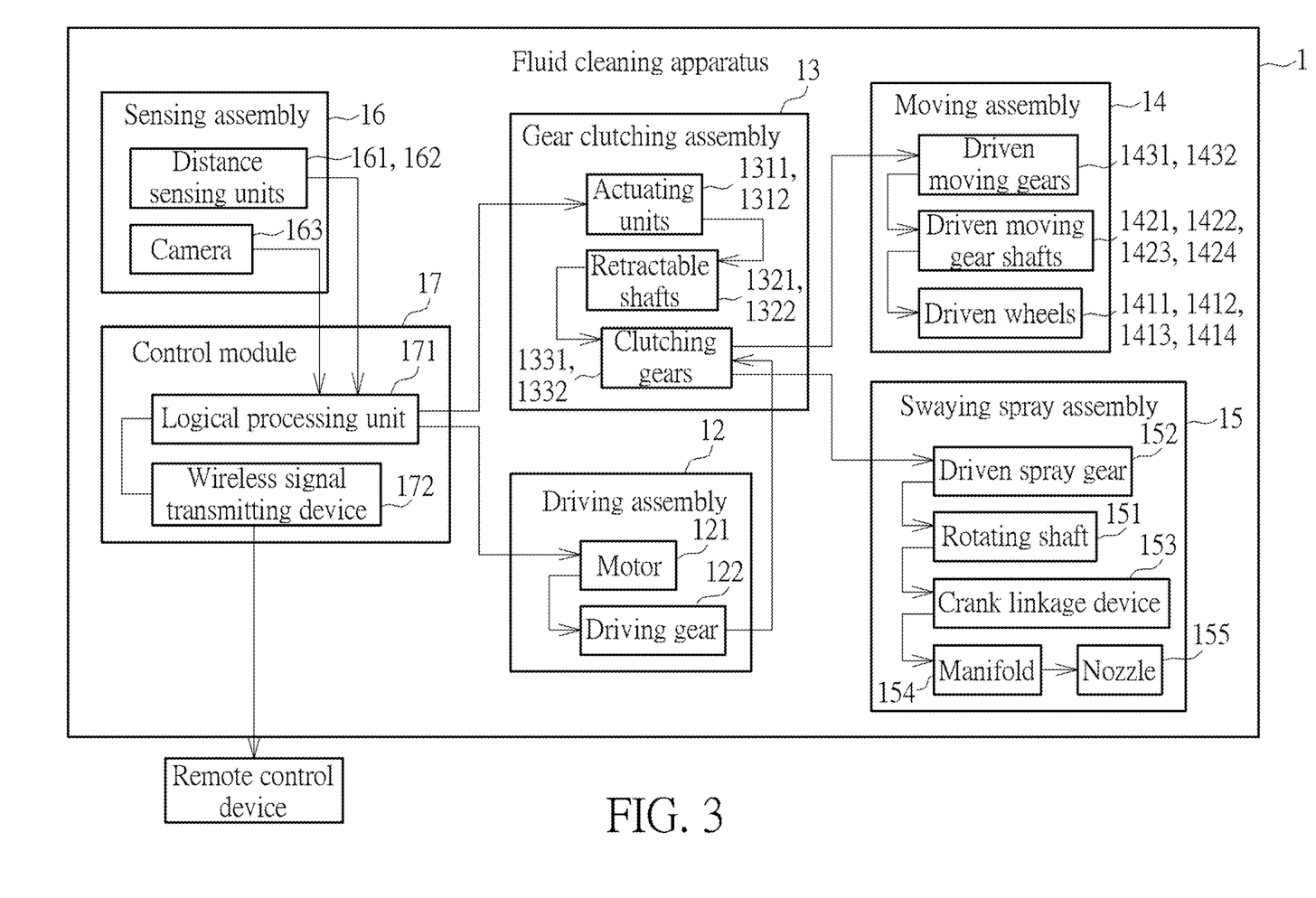
FIG. 3 is a functional block diagram of the fluid cleaning apparatus according to the embodiment of the present application.

Further detail of the operational principle of the fluid cleaning apparatus is described as follows. Please refer to FIG. 3. FIG. 3 is a functional block diagram of the fluid cleaning apparatus 1 according to the embodiment of the present application. As shown in FIG. 3, the wireless signal transmitting device 172 can receive a signal from the remote control device operated by the user, and the logical processing unit 171 electrically connected with the wireless signal transmitting device 172 can control the operation of the motor 121, the first actuating unit 1311 and the second actuating unit 1312 according to the signal received by the wireless signal transmitting device 172. For example, the logical processing unit 171 can control the first actuating unit 1311 to move the first retractable shaft 1321 for shifting the first clutching gear 1331 so as to control a first clutching status among the first clutching gear 1331, the driving gear 122, the front-left driven moving gear 1431 and the front-right driven moving gear 1432. The logical processing unit 171 can further control the second actuating unit 1312 to move the second retractable shaft 1322 for shifting the second clutching gear 1332 so as to control a second clutching status among the second clutching gear 1332, the driving gear 122 and the driven spray gear 152. Therefore, the user can remotely control operation of the driving assembly 12 and the gear clutching assembly 13 so as to control operation of the moving assembly 14 and the swaying spray assembly 15, and not limited to this.

Figure 4:
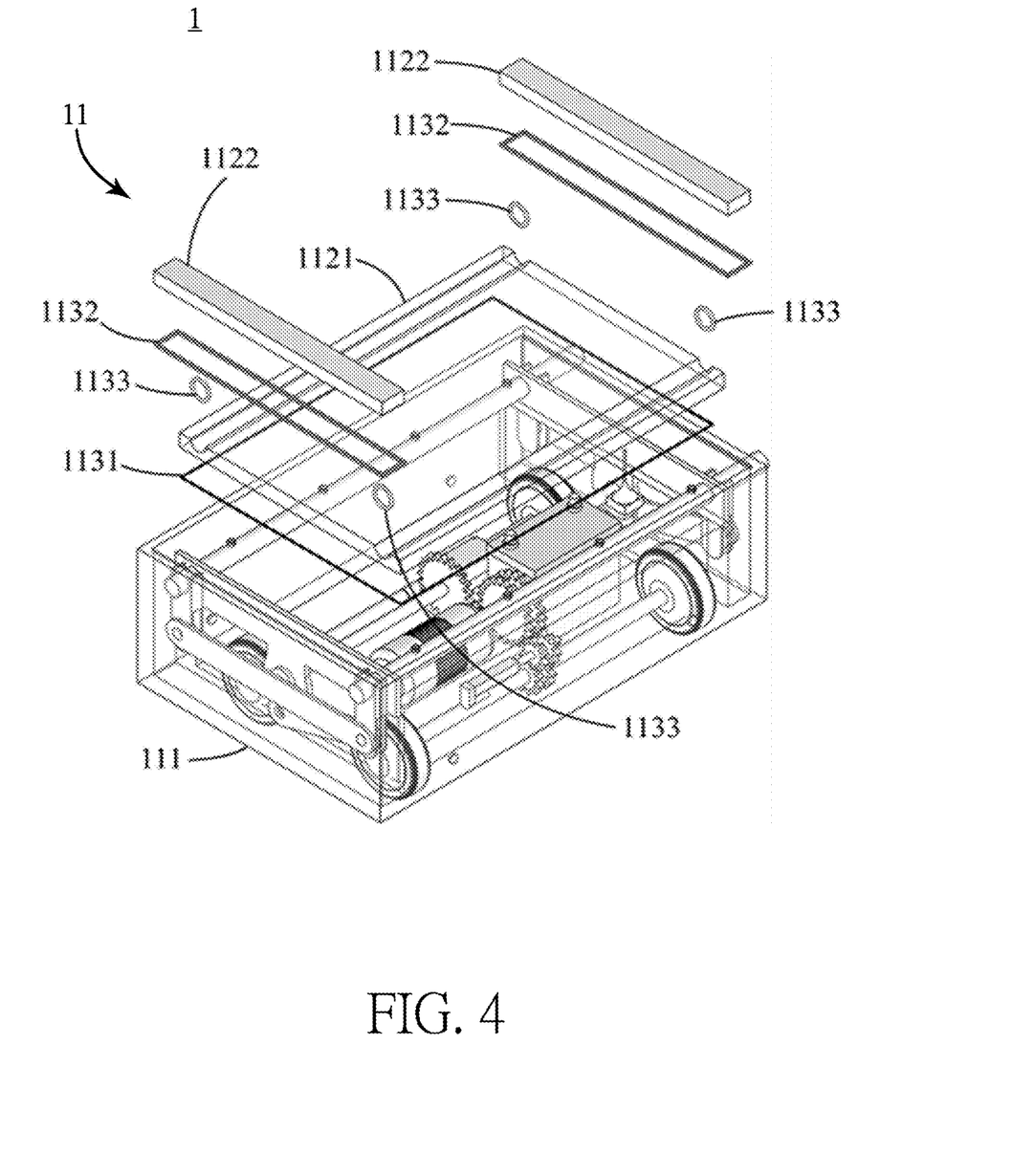
FIG. 4 is an exploded diagram of a waterproof assembly of the fluid cleaning apparatus according to the embodiment of the present application.

Please refer to FIG. 4. FIG. 4 is an exploded diagram of a waterproof assembly 11 of the fluid cleaning apparatus 1 according to the embodiment of the present application. The fluid cleaning apparatus 1 of the present application can further include the waterproof assembly 11. As shown in FIG. 4, the waterproof assembly includes a box body 111 made of metal or other stiff and non-permeable materials. The box body 111 partitioned into an upper part and a lower part by a main partition plate 1121. The upper part is configured as a space where the swaying spray assembly 15 sprays out a cleaning fluid for spray-cleaning. The lower part is configured as an accommodating space for accommodating the driving assembly 12, the gear clutching assembly 13, the moving assembly 14, the swaying spray assembly 15, and the control module 17. A main waterproof strip 1131 and a side waterproof strip 1132 are utilized as sealing means among the main partition plate 1121, side partition plates 1122 and the box body 111. A manifold waterproof strip 1133 is utilized as sealing means between the main partition plate 1121 and the plurality of manifolds 154. Therefore, the lower part is isolated from the upper part substantially by the main partition plate 1121 so that external fluid or pollutants, such as sand, gravel, dust or the sprayed cleaning fluid, are prevented from entering the lower part and from causing damage.

According to a preferred embodiment, the driving assembly 12 is disposed in the lower part of the box body 111 and includes two driving gears 122 disposed on a shaft of the motor 121. The motor 121 can be a motor with variable rotational speed controlled by the logical processing unit 171 of the control module 17 and can drive the two driving gears 122 via the shaft. The first clutching gear 1331 and the second clutching gear 1332 of the gear clutching assembly 13 are driven by the two driving gears 122 when the first clutching gear 1331 and the second clutching gear 1332 engage with the two driving gears 122. By controlling the variable rotational speed of the motor 121, speed of the moving assembly 14 and swaying frequency of the swaying spray assembly 15 can be modulated.

Figure 5:
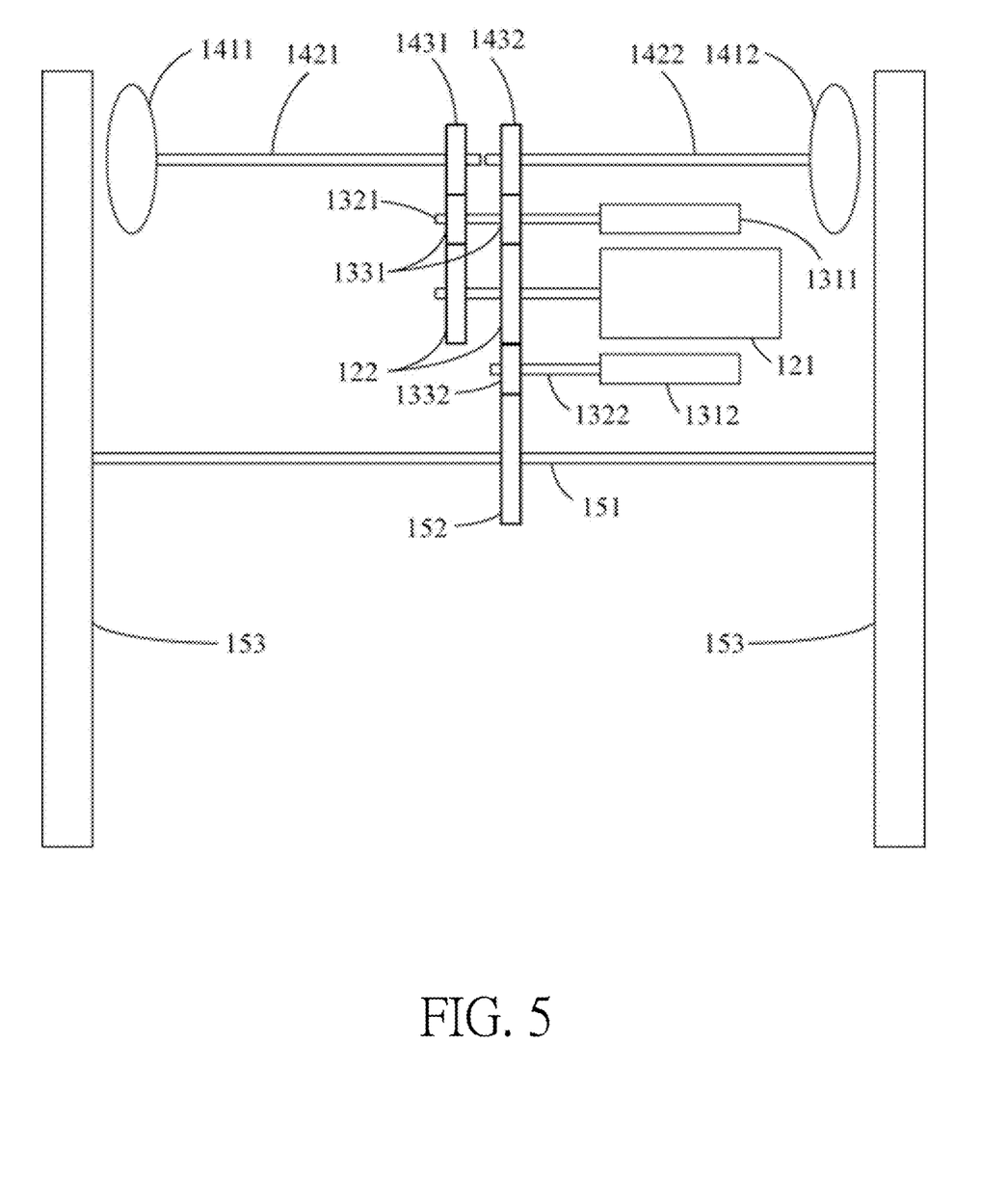
FIG. 5 is a diagram illustrating an integrated driving configuration of the fluid cleaning apparatus with a single motor according to the embodiment of the present application.

Please refer to FIG. 5. FIG. 5 is a diagram illustrating an integrated driving configuration of the fluid cleaning apparatus 1 with a single motor 121 according to the embodiment of the present application. As shown in FIG. 5, the gear clutching assembly 13 includes two actuating units, two retractable shafts, and two sets of clutching gears. The two actuating units are the first actuating unit 1311 and the second actuating unit 1312, i.e. the driven wheel actuating unit and the spray assembly actuating unit respectively. The two retractable shafts are the first retractable shaft 1321 and the second retractable shaft 1322, i.e. the driven wheel retractable shaft and the spray assembly retractable shaft respectively. The two sets of clutching gears are the first clutching gears 1331 and the second clutching gear 1332, i.e. the driven wheel clutching gears and the spray assembly clutching gear respectively. The first actuating unit 1311 and the second actuating unit 1312 can respectively move the first retractable shaft 1321 and the second retractable shaft 1322 to respectively shift the first clutching gears 1331 and the second clutching gear 1332, which thereby controls the first clutching status among the first clutching gear 1331, the driving gears 122 and the front-left driven moving gear 1431 or the front-right driven moving gear 1432 and controls the second clutching status among the second clutching gear 1332, the driving gears 122 and the driven spray gear 152. Further detail of the aforementioned operation principle is described as follows.

When the first clutching gears 1331 engage with the driving gears 122 and the front-left driven moving gear 1431 and/or the front-right driven moving gear 1432, the driving gears 122 drive the first clutching gears 1331, and then the first clutching gears 1331 directly drive the rotation of the front-left driven moving gear 1431 and/or the front-right driven moving gear 1432 so as to drive the driven wheels 1411, 1412 of the moving assembly 14 for controlling motion of the fluid cleaning apparatus 1. When the second clutching gear 1332 engages with the driving gears 122 and the driven spray gear 152, the driving gears 122 drive the second clutching gear 1332, and then the second clutching gear 1332 directly drives rotation of the driven spray gear 152 so as to drive the rotating shaft 151, the crank linkage devices 153 and the manifolds 154 for controlling spray-cleaning with versatile spraying angles.

The moving assembly 14 can be disposed in the lower part of the box body 111 and include four driven wheels, four driven moving gear shafts and two driven moving gears. The four driven wheels are the front-left driven wheel 1411, the front-right driven wheel 1412, the rear-left driven wheel 1413 and the rear-right driven wheel 1414. The four driven moving gear shafts are the front-left driven moving gear shaft 1421, the front-right driven moving gear shaft 1422, the rear-left driven moving gear shaft 1423 and the rear-right driven moving gear shaft 1424. The two driven moving gears are the front-left driven moving gear 1431 and the front-right driven moving gear 1432. The four driven wheels 1411, 1412, 1413, 1414 are respectively mounted to the four driven moving gear shafts 1421, 1422, 1423, 1424 to form four isolated sets. Therefore, each of the four sets can independently carry out motion capable of being different from the other sets.

Figure 6:
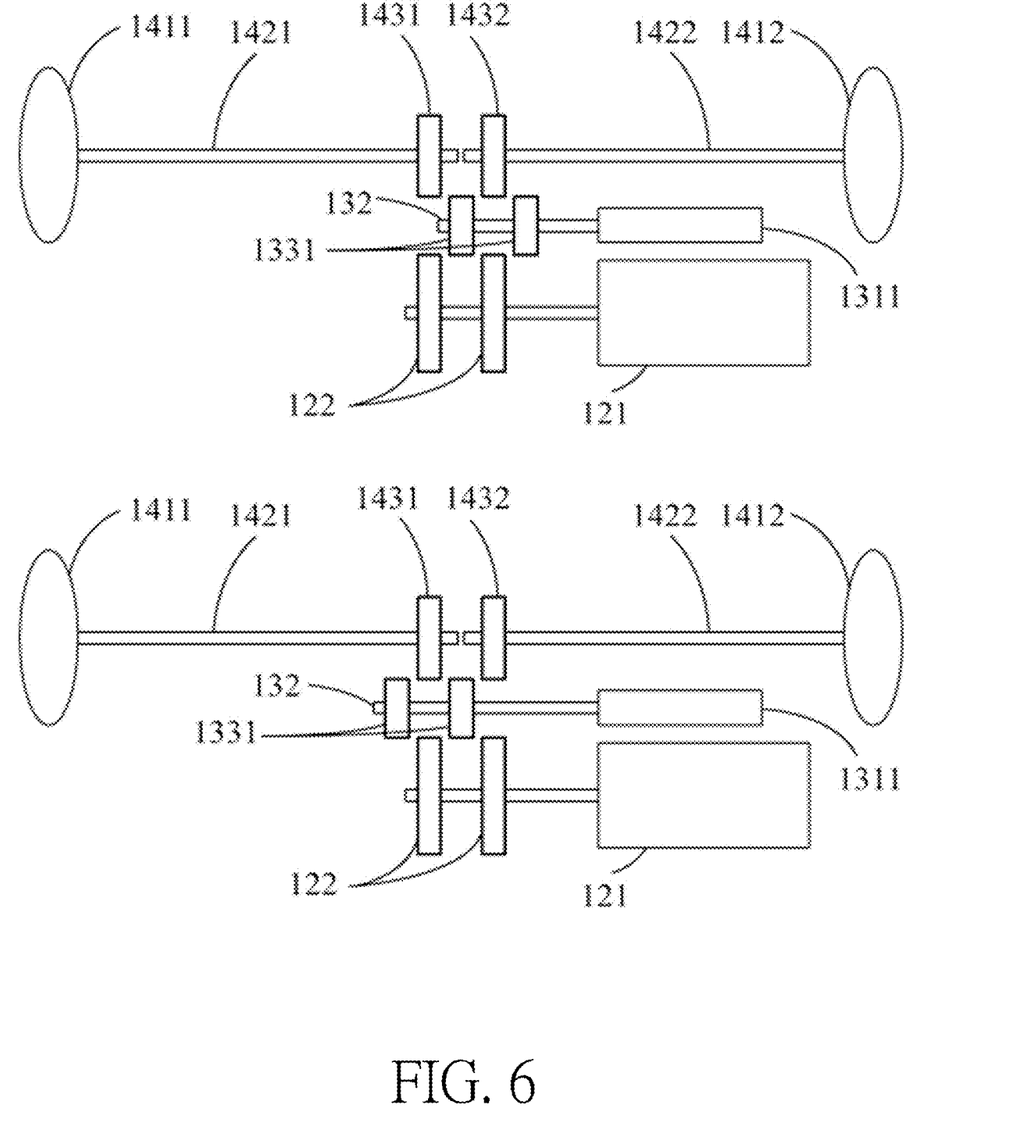
FIG. 6 is a diagram illustrating a configuration of the motionless fluid cleaning apparatus according to the embodiment of the present application.
Figure 7:
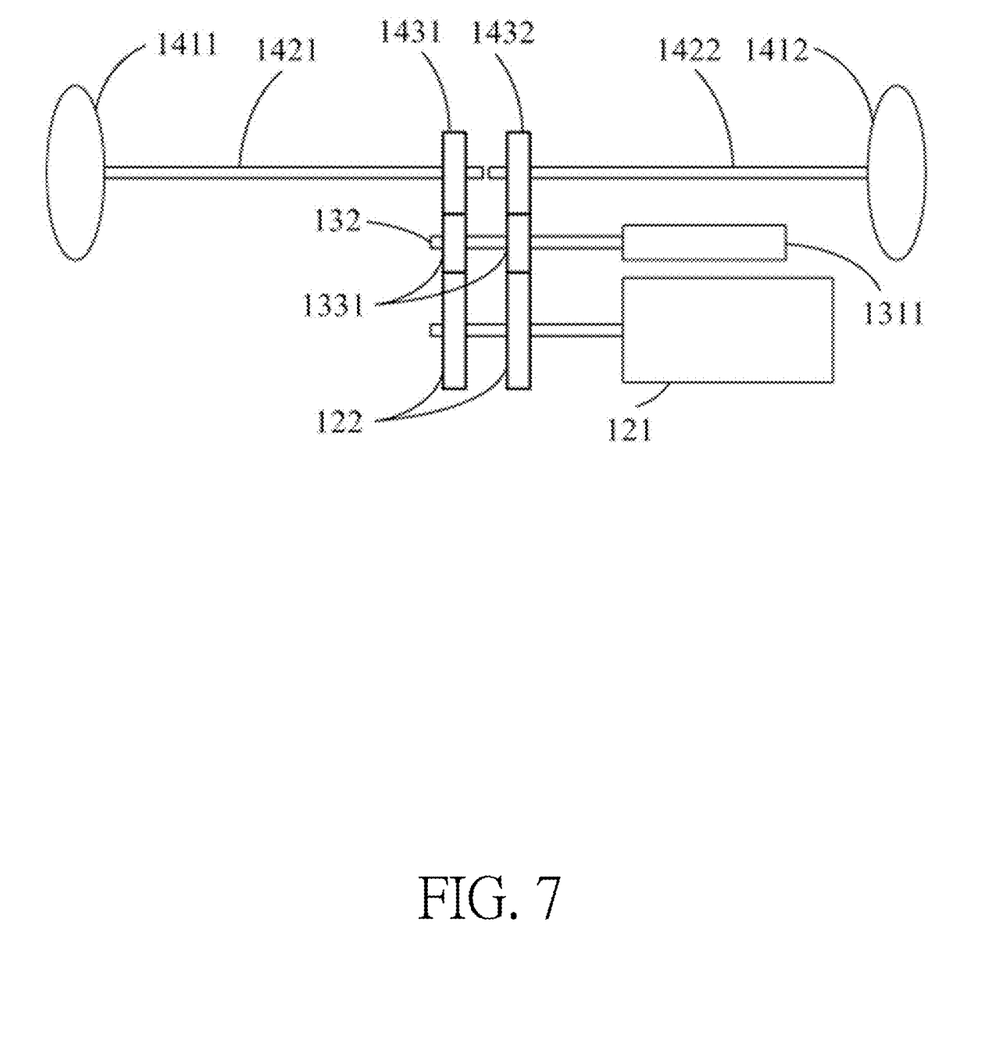
FIG. 7 is a diagram illustrating a configuration of the fluid cleaning apparatus with a straight motion according to the embodiment of the present application.
Figure 8:
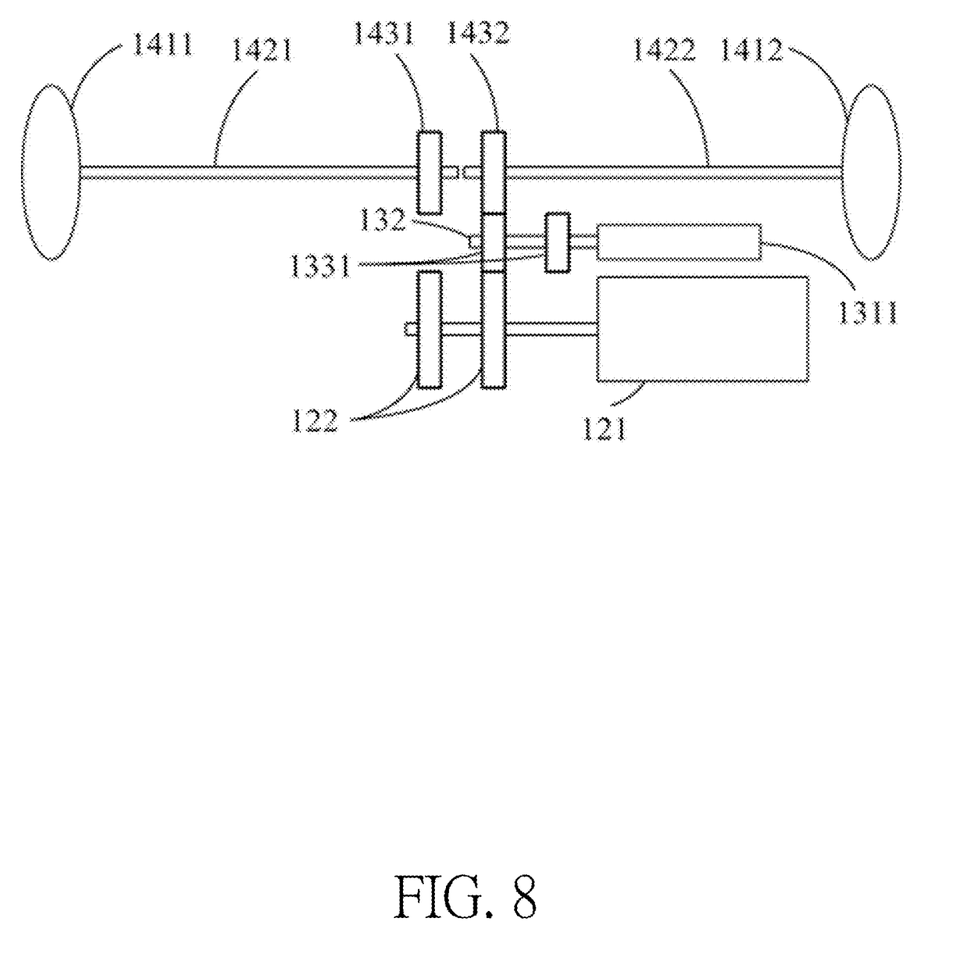
FIG. 8 is a diagram of a configuration of the fluid cleaning apparatus with a left-turning motion according to the embodiment of the present application.
Figure 9:
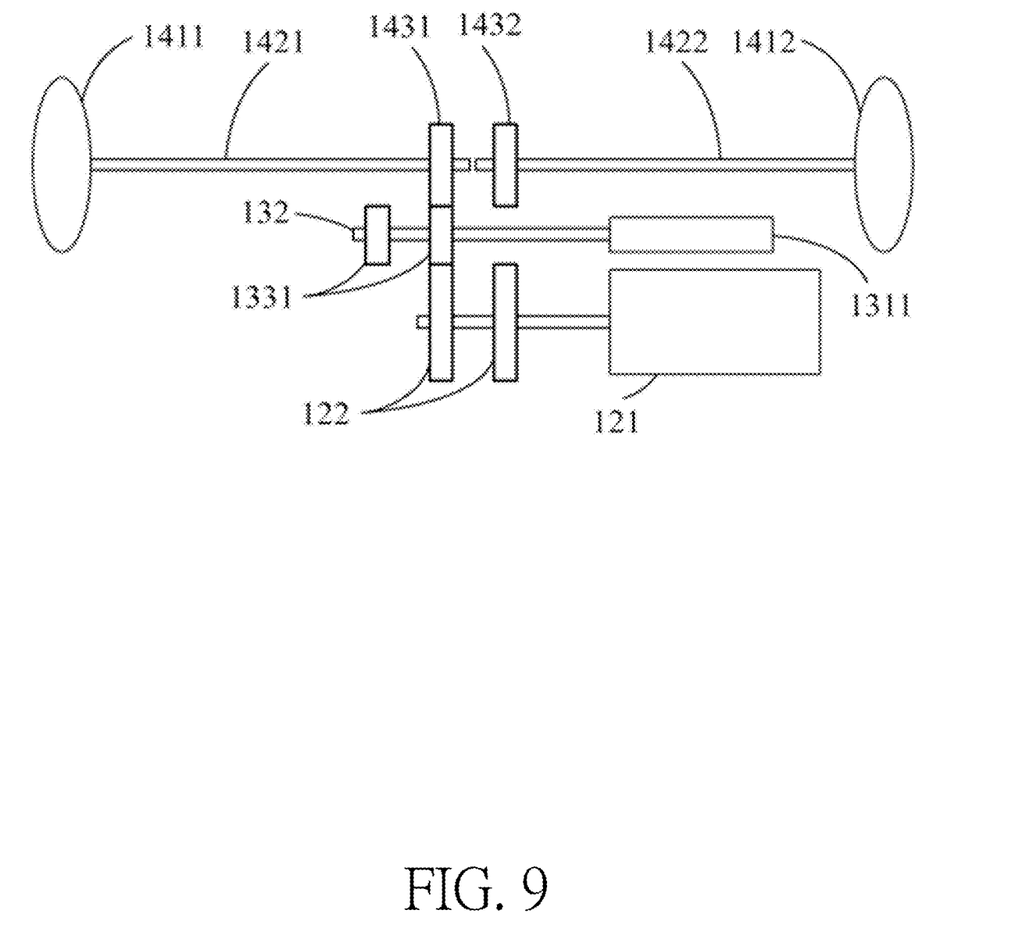
FIG. 9 is a diagram illustrating a configuration of the fluid cleaning apparatus with a right-turning motion according to the embodiment of the present application.

Please refer to FIG. 5 to FIG. 9. FIG. 6 is a diagram illustrating a configuration of the motionless fluid cleaning apparatus according to the embodiment of the present application. FIG. 7 is a diagram illustrating a configuration of the fluid cleaning apparatus with a straight motion according to the embodiment of the present application. FIG. 8 is a diagram of a configuration of the fluid cleaning apparatus with a left-turning motion according to the embodiment of the present application. FIG. 9 is a diagram illustrating a configuration of the fluid cleaning apparatus with a right-turning motion according to the embodiment of the present application. As shown in FIG. 6 to FIG. 9, the front-left driven moving gear 1431 and the front-right driven moving gear 1432 are respectively disposed to the front-left driven moving gear shaft 1421 and the front-right driven moving gear shaft 1422 so as to form two isolated sets. According to shift operation of the first actuating unit 1311, the first clutching gears 1331 can be shifted among the front-left driven moving gear 1431, the front-right driven moving gear 1432 and the driving gears 122 so as to achieve three different configurations, as shown in FIG. 7 to FIG. 9. Therefore, the first clutching gears 1331 can engage with only one of or both of the front-left driven moving gear shaft 1421 and the front-right driven moving gear shaft 1422 so that the front-left driven wheel 1411 and the front-right driven wheel 1412 can be separately or simultaneously driven by the first clutching gears 1331 for achieving steering motion or straight motion of the fluid cleaning apparatus respectively.

Figure 10:
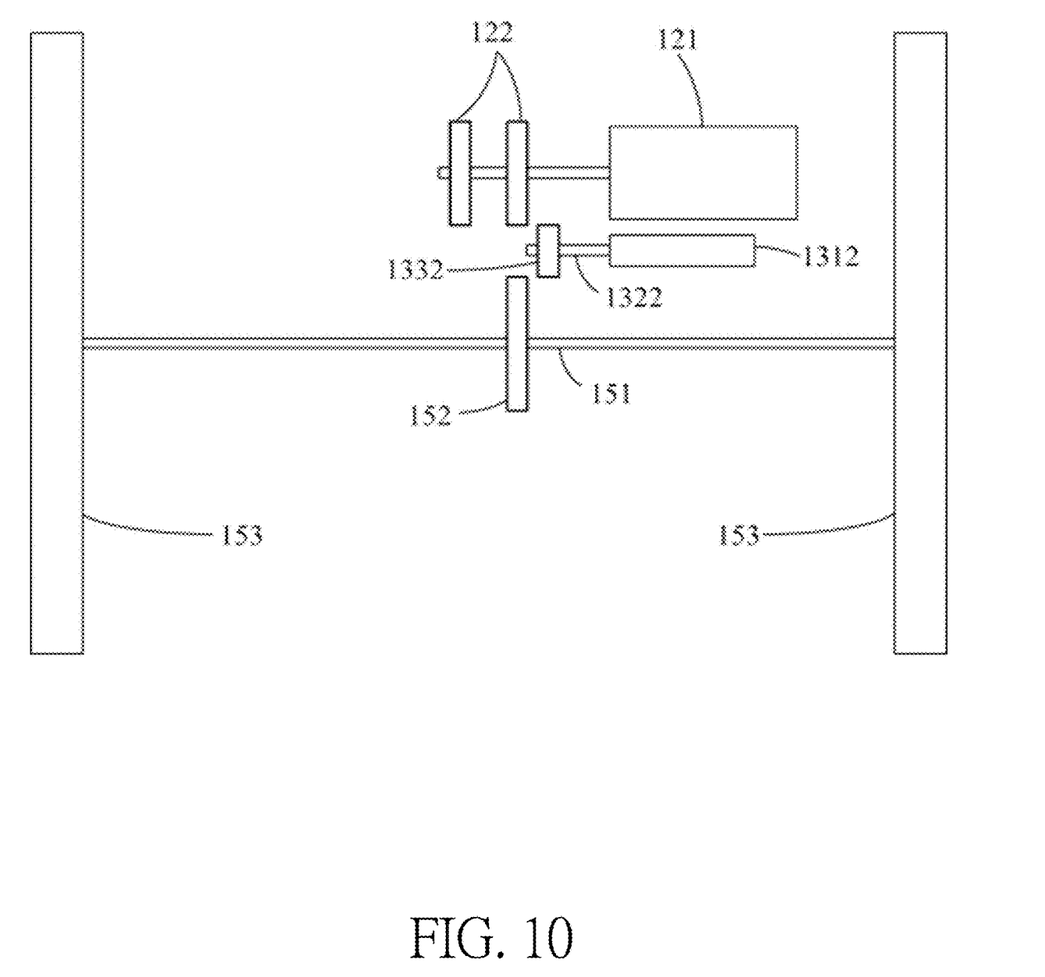
FIG. 10 is a diagram illustrating a configuration of the swaying spray assembly without swaying motion according to another embodiment of the present application.
Figure 11:
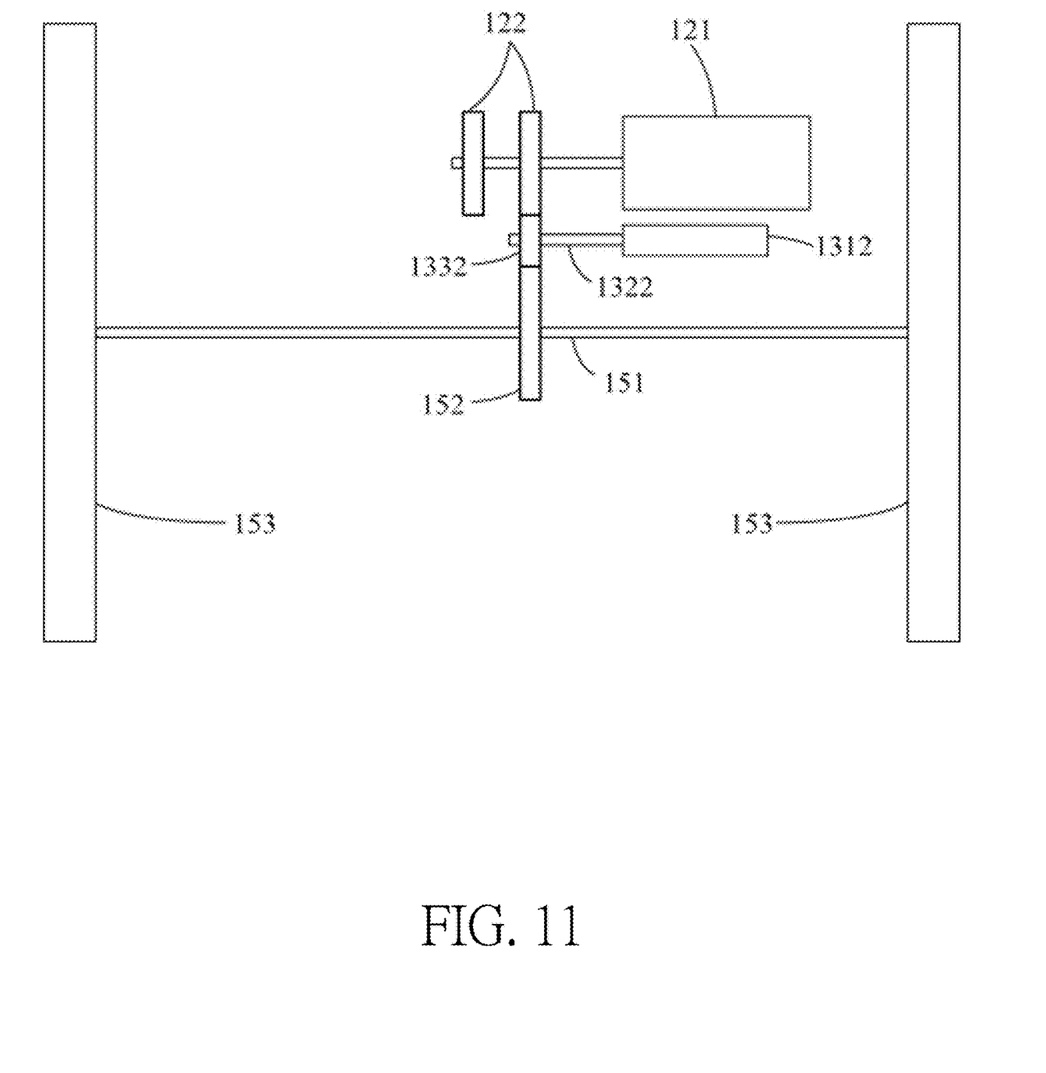
FIG. 11 is a diagram illustrating a configuration of the swaying spray assembly with swaying motion according to the embodiment of the present application.

Please refer to FIG. 10 and FIG. 11. FIG. 10 is a diagram illustrating a configuration of the swaying spray assembly 15 without swaying motion according to another embodiment of the present application. FIG. 11 is a diagram illustrating a configuration of the swaying spray assembly 15 with swaying motion according to the embodiment of the present application. The swaying spray assembly 15 includes a rotating shaft 151, a driven spray gear 152, two crank linkage devices 153, two manifolds 154 and multiple nozzles 155. The driven spray gear 152 is disposed on the rotating shaft 151 and can engage with the second clutching gear 1332. The two crank linkage devices 153 are connected with the rotating shaft 151. The two manifolds 154 are connected with the two crank linkage devices 153. The multiple nozzles 155 are disposed on the two manifolds 154. The rotating shaft 151, the driven spray gear 152 and the two crank linkage devices 153 are disposed in the lower part of the box body 111, while the two manifolds 154 and the multiple nozzles 155 are disposed in the upper part of the box body 111. Therefore, the cleaning fluid sprayed from the nozzles 155 can be prevented from entering the lower part and from causing damage during the spray-cleaning operation with versatile spraying angles. Further detail of the aforementioned spray-cleaning operation is described as follows.

Please refer to FIG. 11 and FIG. 2. The driven spray gear 152 can engage with and be driven by the second clutching gear 1332 of the gear clutching assembly 13 so as to drive rotation of the rotating shaft 151. The two crank linkage devices 153 are respectively disposed on a left side and a right side of the lower part of the box body 111, and each of the two crank linkage devices 153 includes a crank 1531, a linkage bar 1532 and a pair of rocking bars 1533. Each crank linkage device 153 is linked with the rotating shaft 151 through the crank 1531. The crank 1531 is linked with the linkage bar 1532 linked with the pair of rocking bars 1533, and the pair of rocking bars 1533 on the left side are further respectively connected with the corresponding pair of rocking bars 1533 on the right side through the two manifold 154. Rotation of the rotating shaft 151 can drive the crank 1531 to sway the linkage bar 1532, and swaying motion of the linkage bar 1532 can sway the pair of rocking bars 1533 so that the manifold 154 can be driven by the pair of rocking bars 1533 to rotate, which enables the multiple nozzles 155 on the manifold 154 to spray with versatile spraying angles. It should be noticed that a maximum rotation range of each of the two manifolds 154 can reach 180 degrees. Flow rate of the nozzle 155 can be modulated by adjusting parameters such as a nozzle shape and fluid pressure and can reach a maximum of 200 gallon per minute.

Please refer to FIG. 1 and FIG. 2. The fluid cleaning apparatus 1 of the present application can further include a sensing assembly 16. The sensing assembly 16 includes four horizontal distance sensing units 161, two vertical distance sensing units 162 and a camera 163. The four horizontal distance sensing units 161 are respectively disposed on a front side, a rear side, a left side and a right side of the box body 111 and electrically connected with the control module 17. The two vertical distance sensing units 162 and the camera 163 are disposed above on the main partition plate 1121 and electrically connected with the control module 17.

Each of the four horizontal distance sensing units 161 and the two vertical distance sensing units 162 can be, but is not limited to, an ultrasonic distance sensing unit, an infrared distance sensing unit or a laser distance sensing unit and can transmit real-time measured distance data to the control unit 17 for providing information about a move range of the environment and bottom level of a cleaned object, which helps the control unit 17 determine a spraying pressure of the swaying spray assembly 15 and a proper moving direction of the fluid cleaning apparatus 1. Therefore, intelligent and flexible operation and movement control of the fluid cleaning apparatus 1 can be achieved. Besides, the camera 163 can transmit a feedback real-time image of a bottom side of the cleaned object to the control module 17 so that image recognition software of the control module 17 can determine a dirty area on the bottom side of the cleaned object according to the feedback real-time image and a spraying pressure, a spraying angle or motion of the swaying spray assembly can be adjusted by the control module 17 or remotely controlled by a staff. Therefore, the recognized dirty area can be particularly treated via intelligent cleaning capability achieved by the abovementioned configuration.

In practical application, the logical processing unit 171 can be electrically connected with the wireless signal transmitting device 172, the motor 121, the horizontal distance sensing units 161, the vertical distance sensing units 162, the first actuating unit 1311 and the second actuating unit 1312. The logical processing unit 171 can process feedback measured distance data transmitted from the horizontal distance sensing units 161 so as to provide information about movable range of the environment for determining a proper moving direction of the fluid cleaning apparatus 1 and for controlling operation of the motor 121 and the first actuating unit 1311. Therefore, intelligent and flexible movement control, such as advancing, reversing or steering, of the fluid cleaning apparatus 1 can be achieved. The logical processing unit 171 can further process feedback measured distance data transmitted from the vertical distance sensing units 162 so as to calculate a distance from a bottom of the cleaned object to be cleaned by the fluid cleaning apparatus 1 for determining and adjusting a spraying pressure of the swaying spray assembly 15. The logical processing unit 171 can further perform image recognition algorithm on a feedback real-time image transmitted from the camera 163 so as to determine a dirty area on the cleaned object and to adjust a spraying pressure, a spraying angle or motion of the swaying spray assembly 171.

The wireless signal transmitting device 172 can receive the signal from the remote control device operated by the user so that the user can manually control the motion of the moving assembly 14 and the spraying angle of the swaying spray assembly 15. Besides, the abovementioned processed information, such as the determined proper moving direction, the adjusted spraying pressure, recognized dirty area and adjusted spraying angle, can be transmitted by the wireless signal transmitting device 172 to the remote control device and provided for the user. According to the abovementioned configurations of the fluid cleaning apparatus 1, it is concluded that since the wireless signal transmitting device 172 of the controlling module 17 transmits status information of the driving assembly 12, the gear clutching assembly 13, the moving assembly 14, the swaying spray assembly 15, the sensing assembly 16, and data processed by the logical processing unit 171 to the remote control device, the user can remotely control operation of the driving assembly 12, the gear clutching assembly 13 and the sensing assembly 16 via the control module 17 so as to control operation of the moving assembly 14 and the swaying spray assembly 15, and not limited to this.

In summary, the fluid cleaning apparatus disclosed by the present application integrates functions of movement actuation and spraying angle adjustment with a single motor and achieves versatile spraying angles used for spray-cleaning with convertible apparatus configurations between the swaying motion and the ceased swaying motion and/or between the moving motion and the ceased moving motion. Besides, self-propelled movement, spraying pressure modulation, and spraying angle adjustment against the recognized dirty area can be controlled by algorithm of the control module or manually remotely controlled by the user. Since the fluid cleaning apparatus of the present application saves the conventional installation cost and needed space, as well as consumed resources, for cleaning the bottom of an object to be cleaned, the fluid cleaning apparatus can be extensively applied to multiple fields.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fluid cleaning apparatus, comprising:
    a driving assembly comprising:
        a motor; and
        at least one driving gear disposed on a shaft of the motor;
    a gear clutching assembly comprising:
        a first clutching gear disposed adjacent to the at least one driving gear;
        a second clutching gear disposed adjacent to the at least one driving gear;
        a first retractable shaft connected with the first clutching gear;
        a second retractable shaft connected with the second clutching gear;
        a first actuating unit disposed on the first retractable shaft; and
        a second actuating unit disposed on the second retractable shaft;
    a moving assembly comprising:
        a driven moving gear disposed adjacent to the first clutching gear;
        a driven moving gear shaft connected with the driven moving gear; and
        a plurality of driven wheels disposed on the driven moving gear shaft;
    a swaying spray assembly comprising:
        a driven spray gear disposed adjacent to the second clutching gear;
        a rotating shaft connected with the driven spray gear;
        a plurality of crank linkage devices disposed on two ends of the rotating shaft;
        a plurality of manifolds connected with the plurality of crank linkage devices respectively; and
        a plurality of nozzles disposed on the plurality of manifolds; and
    a controlling module comprising
        a wireless signal transmitting device for receiving a signal from a remote wireless emitter; and
        a logical processing unit electrically connected with the wireless signal transmitting device, the motor, the first actuating unit and the second actuating unit and for controlling operation of the motor, the first actuating unit and the second actuating unit according to the signal received by the wireless signal transmitting device;
        wherein the logical processing unit controls the first actuating unit to move the first retractable shaft, such that the first clutching gear engages or disengages the at least one driving gear and the driven moving gear, and the logical processing unit further controls the second actuating unit to move the second retractable shaft, such that the second clutching gear engages or disengages the at least one driving gear and the driven spray gear.

2. The fluid cleaning apparatus of claim 1, wherein a plurality of fluid transporting holes are respectively formed on the plurality of manifolds so as to transport a cleaning fluid into the plurality of manifolds.

3. The fluid cleaning apparatus of claim 1, wherein the motor of the driving assembly is a motor with variable rotational speed controlled by the logical processing unit.

4. The fluid cleaning apparatus of claim 1, wherein when the first clutching gear engages with the at least one driving gear and the driven moving gear, the motor and the at least one driving gear drive rotation of the driven moving gear via the first clutching gear so as to drive the plurality of driven wheels.

5. The fluid cleaning apparatus of claim 4, wherein the plurality of driven wheels comprises two driven wheels, the moving assembly further comprises a second driven moving gear and a second driven moving gear shaft, and each of the two driven wheels respectively corresponds to a first set of the driven moving gear shaft and the driven moving gear, and to a second set of the second driven moving gear shaft and the second driven moving gear for respectively driving each of the two driven wheels for steering.

6. The fluid cleaning apparatus of claim 1, wherein the plurality of driven wheels comprises two driven wheels, the moving assembly further comprises a second driven moving gear and a second driven moving gear shaft, and each of the two driven wheels respectively corresponds to a first set of the driven moving gear shaft and the driven moving gear, and to a second set of the second driven moving gear shaft and the second driven moving gear for respectively driving each of the two driven wheels to rotate so that the fluid cleaning apparatus is capable of steering.

7. The fluid cleaning apparatus of claim 1, wherein when the second clutching gear engages with the at least one driving gear and the driven spray gear, the motor and the at least one driving gear drive rotation of the driven spray gear via the second clutching gear so as to drive the rotating shaft, the plurality of crank linkage devices and the plurality of manifolds for spray-cleaning with versatile spraying angles.

8. The fluid cleaning apparatus of claim 1, further comprising a sensing assembly comprising a plurality of distance sensing units electrically connected with the logical processing unit for transmitting real-time measured distance data to the logical processing unit, and the plurality of distance sensing unit being at least one of an ultrasonic distance sensing unit, an infrared distance sensing unit, and a laser distance sensing unit.

9. The fluid cleaning apparatus of claim 8, wherein the sensing assembly further comprises at least one camera electrically connected with the logical processing unit, and the logical processing unit performs image recognition algorithm on a feedback real-time image transmitted from the at least one camera so as to determine a dirty area on a cleaned object and to adjust a spraying pressure, a spraying angle or motion of the swaying spray assembly.

10. The fluid cleaning apparatus of claim 8, wherein the plurality of distance sensing units comprise a horizontal distance sensing unit and a vertical distance sensing unit, the logical processing unit processes feedback measured distance data transmitted from the horizontal distance sensing unit so as to determine a proper moving direction for controlling operation of the motor and the first actuating unit, and the logical processing unit further processes feedback measured distance data transmitted from the vertical distance sensing unit so as to calculate a distance from a bottom of a cleaned object to be cleaned by the fluid cleaning apparatus for determining a spraying pressure of the swaying spray assembly.

11. The fluid cleaning apparatus of claim 10, wherein the sensing assembly further comprises at least one camera electrically connected with the logical processing unit, and the logical processing unit performs image recognition algorithm on a feedback real-time image transmitted from the at least one camera so as to determine a dirty area on the cleaned object and to adjust the spraying pressure, a spraying angle or motion of the swaying spray assembly.

12. The fluid cleaning apparatus of claim 1, wherein the wireless signal transmitting device of the controlling module transmits status information of the driving assembly, the gear clutching assembly, and data processed by the logical processing unit to a remote wireless receiver.

13. The fluid cleaning apparatus of claim 1, further comprising a waterproof assembly comprising a box body, at least one partition plate and at least one waterproof strip for providing waterproof and dustproof functions.

* * * * *

UNITED STATES PATENT AND TRADEMARK OFFICE
CERTIFICATE OF CORRECTION

| | |
|---|---|
| PATENT NO. | : 10,773,270 B2 |
| APPLICATION NO. | : 16/116891 |
| DATED | : September 15, 2020 |
| INVENTOR(S) | : Yi-Rong Zeng et al. |

Page 1 of 1

It is certified that error appears in the above-identified patent and that said Letters Patent is hereby corrected as shown below:

On the Title Page

Item (72), correct the country of the fourth inventor from "(CN)" to --(TW)--.

Signed and Sealed this
Seventeenth Day of November, 2020

Andrei Iancu
*Director of the United States Patent and Trademark Office*